United States Patent [19]
Brown

[11] 4,014,133
[45] Mar. 29, 1977

[54] GREENHOUSE STRUCTURE

[76] Inventor: Howard P. Brown, 104 S. Nash St., Starkville, Miss. 39759

[22] Filed: Apr. 14, 1975

[21] Appl. No.: 567,744

[52] U.S. Cl. .................................. 47/17; 49/40; 49/197
[51] Int. Cl.² .................................. A01G 9/00
[58] Field of Search ............. 47/17, 19, 26, 28–31; 49/40, 41, 42, 74, 75, 82–86, 197

[56] References Cited

UNITED STATES PATENTS

| | | | |
|---|---|---|---|
| 310,982 | 1/1885 | Brown | 47/28 |
| 2,608,797 | 9/1952 | Rawson | 47/19 |
| 2,790,210 | 4/1957 | Falconer | 49/40 X |
| 2,837,372 | 6/1958 | Odom | 49/40 X |
| 2,851,822 | 9/1958 | Fuller | 47/29 |
| 3,005,673 | 10/1961 | Smith et al. | 47/17 X |
| 3,128,508 | 4/1964 | Burnham | 49/40 X |
| 3,421,260 | 1/1969 | Dickinson | 49/197 |
| 3,470,659 | 10/1969 | De Koning et al. | 47/26 X |
| 3,869,827 | 3/1975 | Anderson et al. | 47/17 |

OTHER PUBLICATIONS

The Hobby Greenhouse, a Northwest Cooperative Extension Publication bulletin 112, Sept. 1969.

*Primary Examiner*—Edgar S. Burr
*Assistant Examiner*—James R. Feyrer
*Attorney, Agent, or Firm*—Fishburn, Gold & Litman

[57] ABSTRACT

A greenhouse structure for growing vegetables, flowers, and like plants inside under good conditions particularly in the fall, winter, and early spring portions of the year includes a building structure having a rear wall and opposite end walls and a roof defining an enclosed space having an open front side and a closure member movable between an open position and a closed position with the closure member being adapted to close the open front side of the building structure. Power means are operatively connected to the closure member for moving same between the open position and the closed position in response to temperature measurement within the building structure for controlling some growing conditions of the plants.

6 Claims, 13 Drawing Figures

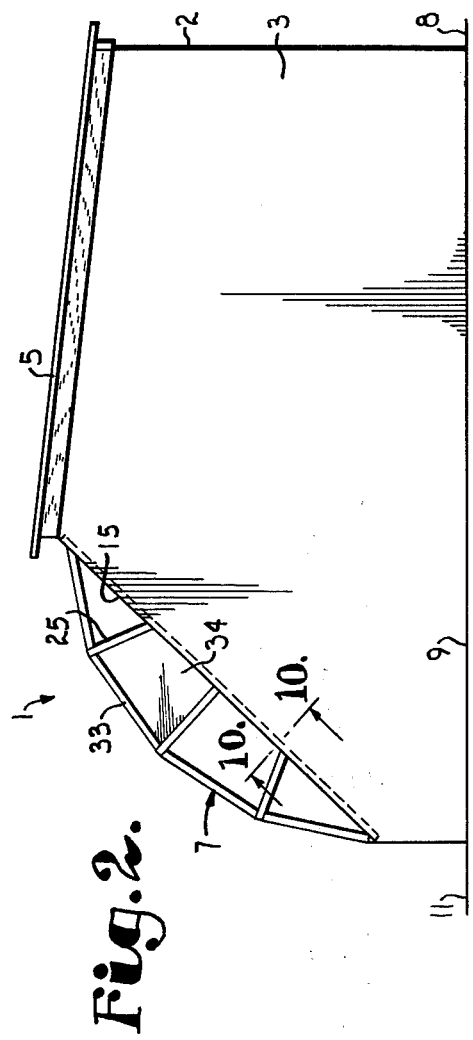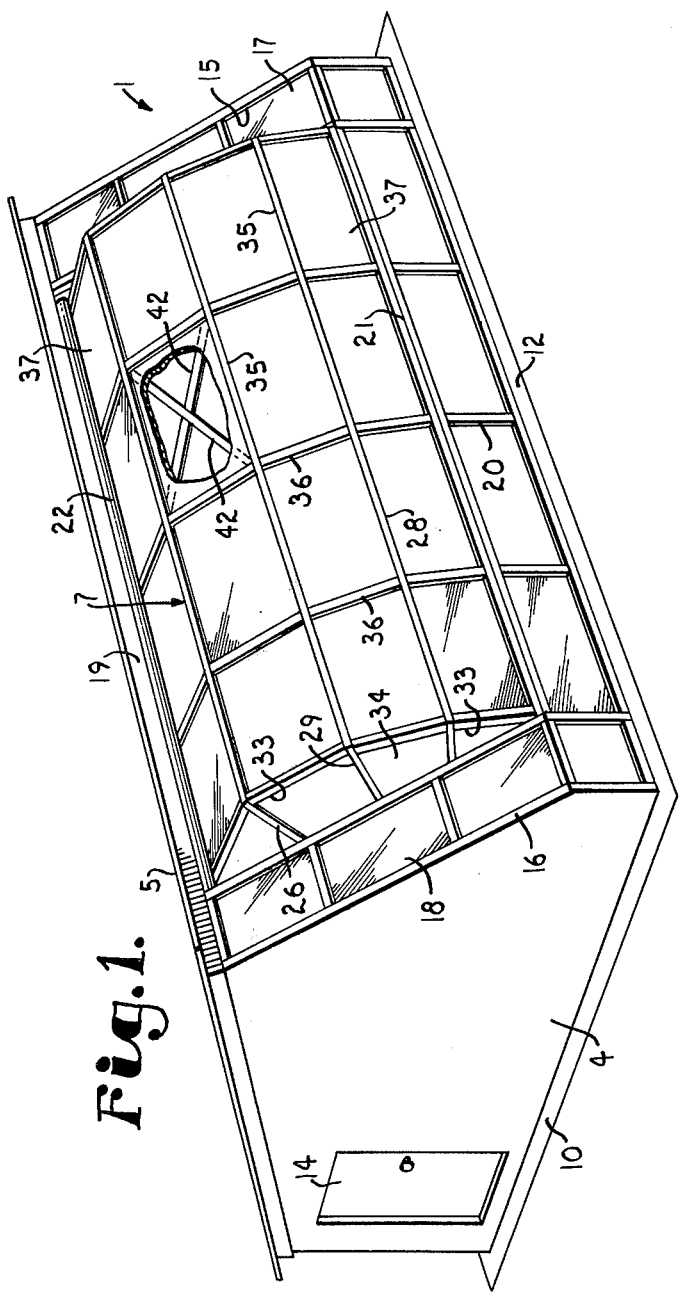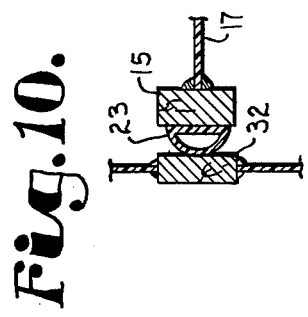

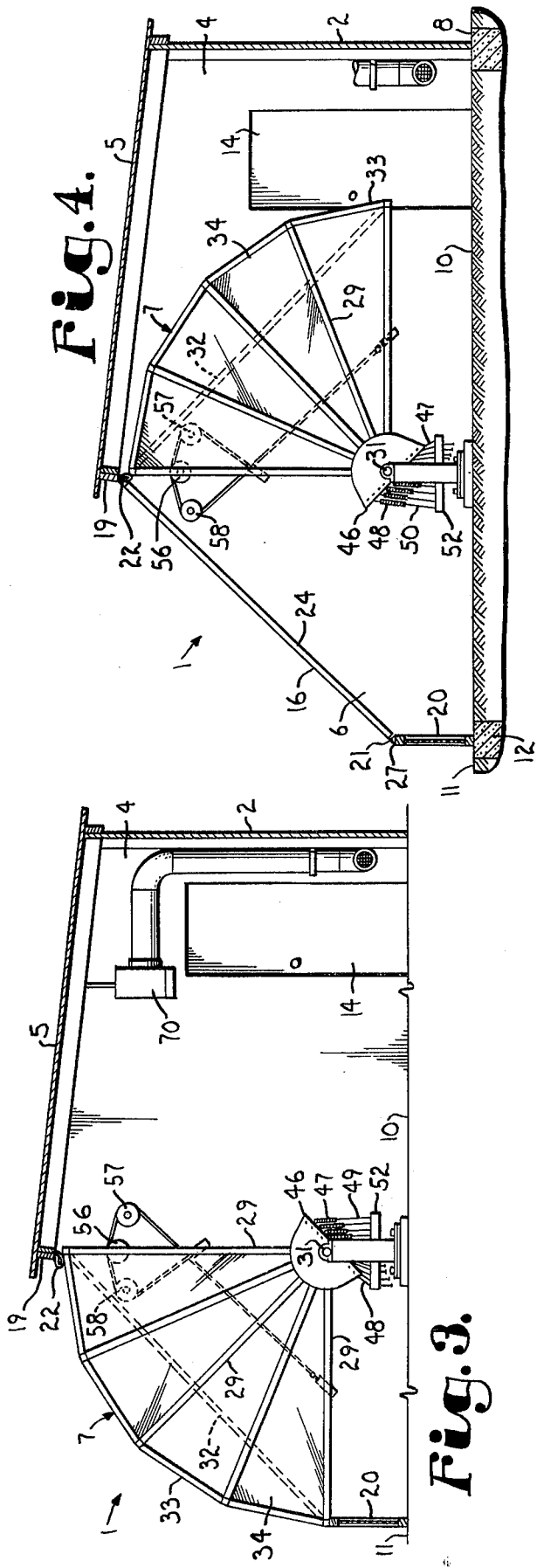

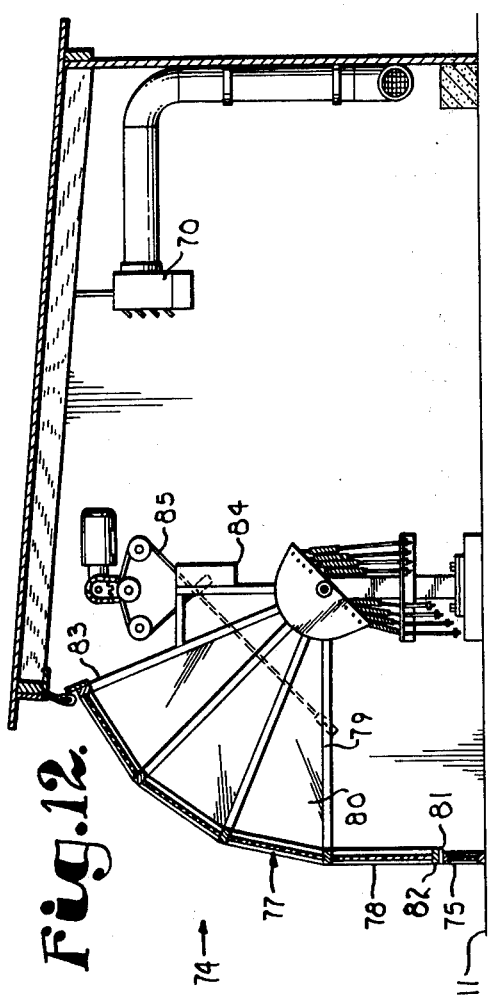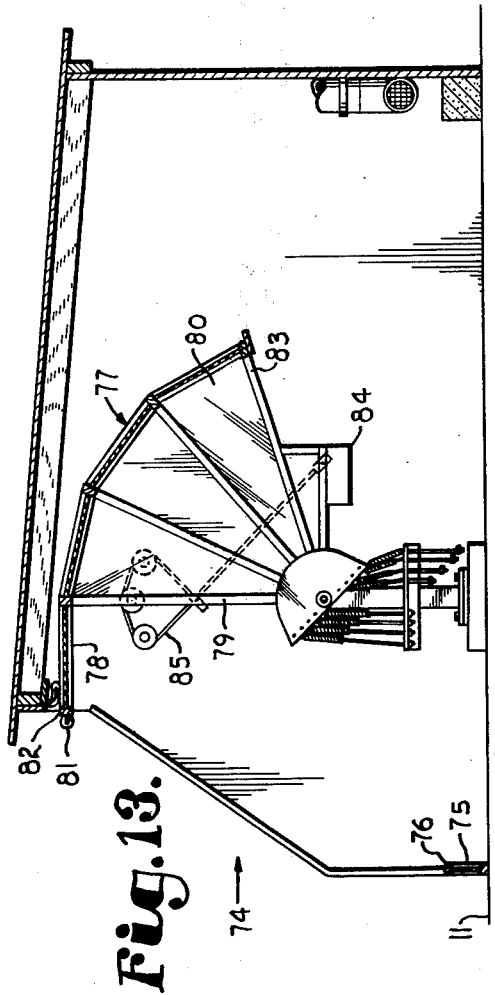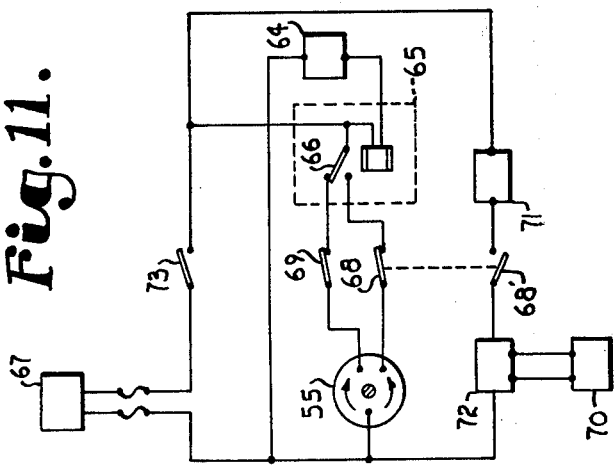

GREENHOUSE STRUCTURE

The present invention relates to greenhouse structures and more particularly to a greenhouse structure having a closure member movable between an open position and a closed position for controlling or closing an open front side of a building structure having insulated rear and opposite end walls and roof.

It is well established that vegetables, flowers, and other plants grown in greenhouses and commonly called hothouse plants are generally inferior in quality of fruit and other edible portions to vegetables grown in open air due to improved pollination, direct sunlight, natural moisture, and the like.

The principal objects of the present invention are: to provide a greenhouse structure for growing vegetables, flowers, and like plants, combining the benefits of natural sunlight and air circulation with the benefits of greenhouse temperatures and like conditions; to provide such a greenhouse structure for growing vegetables, flowers, and like plants inside under good conditions particularly during the fall, winter, and early spring portions of the year; to provide such a greenhouse structure including a building structure having rear and end walls and a roof arranged to define an insulated enclosed space with an open front side positioned to receive sunlight during the colder portions of the year; to provide such a greenhouse structure having a closure member movable between an open position and a closed position with the closure member closing the open front side of the building structure; to provide such a greenhouse structure wherein the open front side faces south to thereby permit natural sunlight and air circulation while reducing energy required to cool the greenhouse structure on warm or hot days; to provide such a greenhouse structure having a front wall portion removably mounted to permit earth working machinery to enter the building structure and prepare soil therein for seed beds and the like; to provide such a greenhouse structure wherein the closure member is mounted within the building structure in a manner to be movable easily by hand or by power means; to provide such a greenhouse structure wherein the closure member is movable between the open and closed positions in response to temperature measurements within the building structure; to provide such a greenhouse structure having resilient means operatively connected to the closure member and positioned to cushion starting and stopping movement of the closure member when moving between the open and closed positions; and to provide such a greenhouse structure which is economical to construct, formed of durable material, attractive in appearance, and particularly well adapted for the proposed use.

Other objects and advantages of this invention will become apparent from the following description taken in connection with the accompanying drawings, wherein are set forth by way of illustration and example, certain embodiments of this invention.

The drawings constitute a part of the specification and include exemplary embodiments of the present invention and illustrate various objects and features of the greenhouse structure.

FIG. 1 is a perspective view of a greenhouse structure embodying features of the present invention and showing a closure member in a closed position.

FIG. 2 is an end elevational view of the greenhouse structure showing the closure member in the closed position.

FIG. 3 is a transverse sectional view through the greenhouse structure and showing the closure member in the closed position.

FIG. 4 is a transverse sectional view through the greenhouse structure and showing the closure member in the open position.

FIG. 6 is longitudinal sectional view through the greenhouse structure taken on line 6—6 of FIG. 5.

FIG. 7 is a further enlarged fragmentary sectional view taken on line 7—7 of FIG. 5 and showing mounting of one end of the closure member.

FIG. 8 is a further enlarged fragmentary sectional view taken on line 8—8 of FIG. 5 and showing one end of a flexible member connected to the closure member.

FIG. 10 is a further enlarged fragmentary sectional view taken on line 10—10 of FIG. 2 and showing seal means engageable with the ends of the closure member.

FIG. 11 is an electrical circuit for activating power means for moving the closure member between the open and closed positions.

FIG. 12 is a transverse sectional view of a modified greenhouse structure and showing a modified closure member in a closed position.

FIG. 13 is a transverse sectional view of the modified greenhouse structure silimar to FIG. 12 except showing the modified closure member in the open position.

Figures 5, 9:
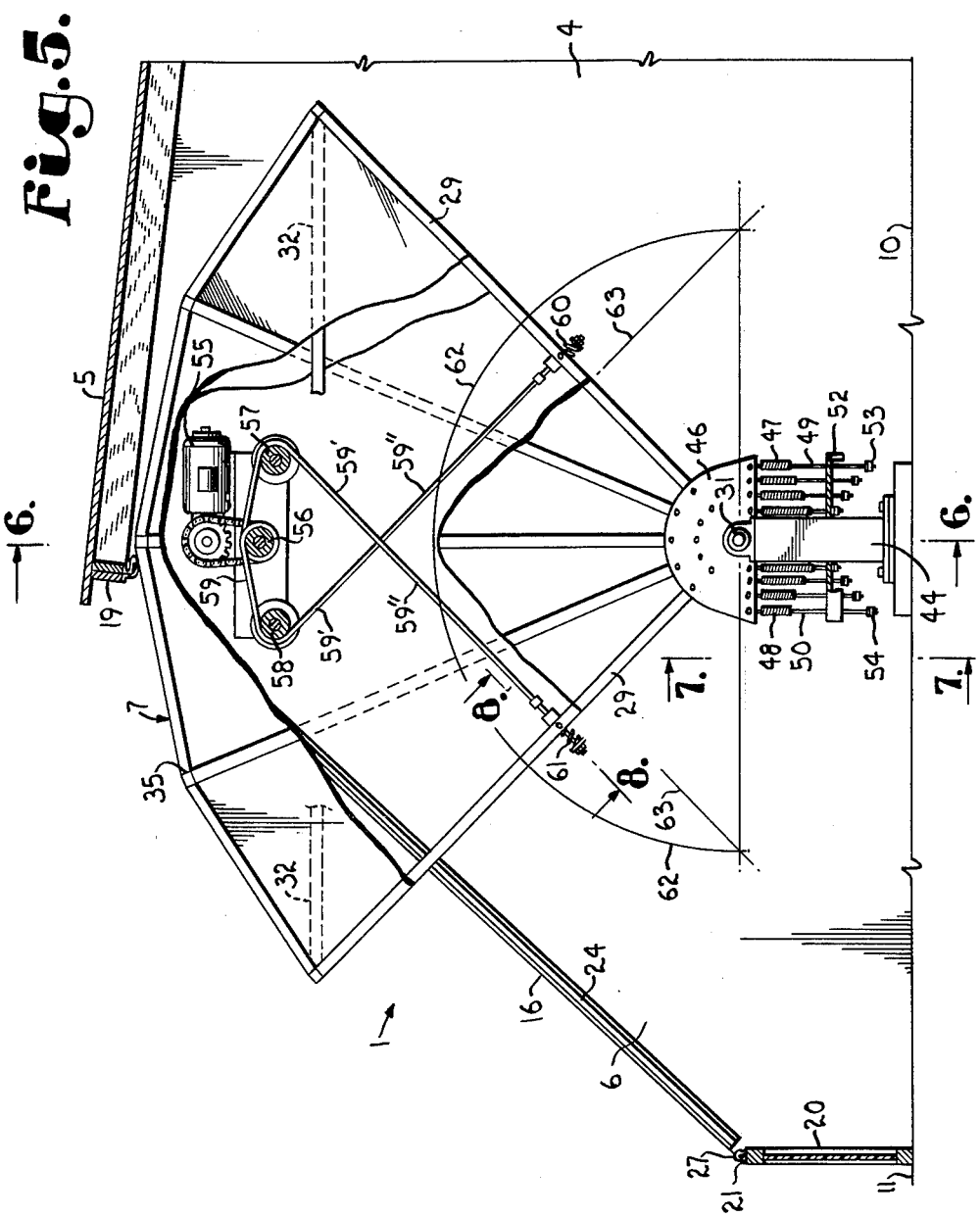
FIG. 5 is an enlarged fragmentary transverse sectional view through the greenhouse structure and showing the closure member in an intermediate position between the open and closed positions.
FIG. 9 is a further enlarged fragmentary sectional view taken on line 9—9 of FIG. 5 and showing power means for moving the closure member between the open and closed positions.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 designates generally a greenhouse structure for growing vegetables, flowers, and like plants particularly in the fall, winter, and early spring portions of the year. The greenhouse structure 1 includes a building structure having a rear wall 2 and opposite end walls 3 and 4 and a roof 5 arranged to define an enclosed space having an open front side 6. A closure member 7 is movable to selected positions between an open position and a closed position with the closure member 7 closing the open front side 6 of the building structure. Power means are operatively connected to the closure member 7 for moving same between an open position and a closed position in response to temperature measurement within the building structure. The open front is elongated and the closure member 7 has an arcuate or generally cylindrical segment wall portion movable on an axis thereof between the open and closed positions.

The building structure may be any suitable construction having an open front. The greenhouse structure may be placed in a side hill excavation with the exposed face defining the rear of the greenhouse structure. End wall portions and a roof are constructed to define an enclosed space having an open front side.

The building structure is suitably supported on a foundation formed of poured concrete or other suitable material and includes a rear foundation 8 adapted to support the rear wall 2 and opposite end foundations 9 and 10 adapted to support the end walls 3 and 4. The rear foundation 8 and the end foundations 9 and 10 may include wall portions extending above a ground surface 11 and having the respective walls mounted thereon. A front foundation 12 extends between front ends of the end foundations 9 and 10. The top of the front foundation 12 is preferably flush or level with the ground surface 11 to thereby permit power equipment to pass over the front foundation 12 for working soil within the greenhouse structure 1 during preparation of seed beds therein, and the like.

The rear wall 2 and the end walls 3 and 4 of the building structure may be any conventional wall construction, such as wood, metal, masonry, and the like, which is adapted to be provided with thermal insulation. One of the end walls, for example, end wall 4, has a door 14 therein for access to the greenhouse structure 1 when the closure member 7 is in the closed position. The end walls 3 and 4 have inclined upper edge portions 15 and 16 respectively extending between respective front ends thereof and a position intermediate the ends of the respective end walls. Suitable translucent panels 17 and 18 are mounted in the inclined upper edge portions 15 and 16 respectively of the ends walls 3 and 4 to permit sunlight to pass therethrough for substantially full utilization of the soil within the greenhouse structure 1.

The roof 5 may also be of any conventional construction having a forward edge portion 19 positioned intermediate the rear wall 2 and the front foundation 12. The forward edge portion 19 of the roof 5 is positioned adjacent the rear end of the translucent panels 17 and 18.

A front wall portion 20 is removably mounted on the front foundation 12 and has an upper edge 21 engageable by one edge of the closure member 7 when in the closed position.

It is desirable to provide weather seals engageable with the periphery of the closure member 7 when in the closed position conserving fuel when heating the greenhouse structure 1 is required. In the illustrated embodiment, a flexible seal member 22 is mounted on and depends from the forward edge portion 19 of the roof 5 and is in engagement with the closure member 7 when same is in the closed position, open position, or in any intermediate position between the open and closed positions. Seal members 23 and 24 are mounted on inwardly facing surfaces of the upper edge portions 15 and 16 of the end walls 3 and 4 respectively and the seal members 23 and 24 are positioned to engage opposite end portions 25 and 26 of the closure member 7. A seal member 27 is mounted on the upper edge 21 of the front wall portion 20 and is engageable by a lower edge of the closure member 7 when same is in the closed position.

The closure member 7 includes a side wall portion 28 extending between the end portions 25 and 26. The illustrated end portions 25 and 26 each have a plurality frame members 29 extending raidally from axle members 30 and 31 which have the end portions 25 and 26 respectively mounted thereon. The frame members 29 are arranged to define first and second edge members positioned substantially perpendicular one to the other. The end portions 25 and 26 each include a bracing member 32 which is positioned adjacent and parallel with the upper edge portions 15 and 16 of the end walls 3 and 4 when the closure member 7 is in a closed position. The end portions 25 and 26 each include a plurality of end members 33 which are positioned at an intersection of the end portions and the side wall portion 28.

Suitable translucent material 34 is preferably mounted between the end members 33 and the bracing member 32 to permit sunlight to enter the greenhouse structure 1 during morning and afternoon hours. The end portions 25 and 26 of the closure member 7 may have material between the bracing member 32 and the frame members 29 which may be opaque and formed of material adapted to add strength to the closure member 7.

The side wall portion 28 of the closure member 7 is formed of a plurality of longitudinally extending and circumferentially spaced members 35 arranged to define first and second edge members with one of the edge members being engageable with the seal member 27 on the upper edge 21 of the front wall portion 20. The side wall portion 28 includes a plurality of longitudinally spaced chord members 36 each positioned substantially perpendicular to respective longitudinally extending members 35 to thereby define a plurality of panels each adapted to receive translucent material 37 between the respective longitudinally extending members 35 and the chord members 36.

Clear vinyl, plastic, nylon, and glass have been found to possess the desired characteristics for the translucent panels 37 of the side wall portion 28 and the opposite end portion 25 and 26 of the closure member 7 and the panels 17 and 18 of the end walls 3 and 4.

The closure member 7 is preferably a substantially rigid structure and has first brace members 38 and 39 extending between the side wall portion 28 and the opposite end portions 25 and 26 respectively. Second brace members 40 and 41 extend between the side wall portion 28 and the opposite end portions 25 and 26 and cross the first brace members 38 and 39 respectively and are preferably suitably secured thereto.

Each panel in the side wall portion 28 formed by the longitudinally extending members 35 and the chord members 36 is preferably braced by a pair of crossing brace members 42.

Mounting of the closure member 7 within the building structure includes a pair of upstanding support members 43 and 44 positioned adjacent the end walls 3 and 4 and having the axle members 30 and 31 respectively mounted thereon in suitable bearings. The axle members 30 and 31 are preferably positioned on the center-line of the respective upstanding members 43 and 44. In the illustrated structure, the opposite end portions 25 and 26 of the closure member 7 have mounting members 45 and 46 with one end of each of the respective frame members 29 connected thereto.

A first and second plurality of resilient members 47 and 48 are provided for each of the upstanding members 43 and 44. The resilient members 47 and 48 each have one end thereof connected to the respective mounting members with the first and second plurality of resilient members 47 and 48 being on first and second sides respectively of the axle members 30 and 31.

A first and second plurality of elongated flexible members 49 and 50 each have one end thereof connected to the other end of a respective one of the first and second plurality of resilient members 47 and 48 and depend therefrom.

Abutment members 51 and 52 are mounted on the upstanding members 43 and 44 respectively and extend transversely thereof. The abutment members 51 and 52 each have first and second plurality of longitudinally spaced guide apertures therein. Each of the apertures in the abutment members 51 and 52 have a respective one of the flexible members 49 and 50 extending thereto.

The flexible members 49 and 50 have enlarged end portions 53 and 54 respectively on the other end thereof and each are engageable with the respective abutment member 51 and 52 during movement of the closure member 7 between the open and closed positions.

The length of the resilient members 47 and 48 and the length of the flexible members 49 and 50 vary from the shortest being positioned adjacent the respective axle member to the longest being positioned fartherest from the axle member whereby the resilient members closest to the axle members are in tension prior to the exterior resilient members during movement of the closure member 7 to thereby cushion said movement.

The resilient members 47 and 48 and the flexible members 49 and 50 are arranged in a manner such that the closure member 7 may be moved manually between the open and closed position, however, automatic opening and closing of the closure member 7 is desired in response to measurement of the temperature level within the building structure 1.

An electric reversible motor 55 is mounted on one of the upstanding members, for example upstanding member 44, and has a drive pulley 56 positioned on the center-line of the one upstanding member 44. First and second direction changing pulley 57 and 58 are mounted on the upstanding member 44 and positioned on opposite sides of the drive pulley 56, an elongated flexible member 59, such as a rope, cable, or the like, is in engagement with the pulley 56, 57, and 58 and has opposite ends thereof connected to the first and second edge members 29 of one of the end portions of the closure member 7. In the illustrated structure each end of the flexible member 59 has an extension 59' extending through a suitable bracket 29' and having an abutment or stop 59" on the end thereof. Mounting or connection of the extensions 59' on the respective edge frame members 29 includes first and second resilient members 60 and 61 each sleeved on a respective extension 59' and positioned between the respective bracket 29' and the abutment 59".

Positioning of the direction changing pulleys 57 and 58 and location of the resilient members 60 and 61 at the first and second edge members 29 cooperate for smooth movement of the closure member 7. As best seen in FIG. 5, an intersection of an arc 62 drawn on a radius equal to one-half of the radius of the closure member 7 with a line extending horizontally through the respective axle member and in the plane of the respective closure member end portion defines a point for a line 63 extending perpendicular to the edge members 29 when in the intermediate position shown in FIG. 5. The resilient members 60 and 61 are connected to the respective edge members 29 of the end portion at points centered between and equally spaced from the intersection of the arc 62 and line 63 with the respective edge member. The opposite end portions of the flexible member 59 are perpendicular one to the other and to the respective edge members 29. The opposite end portions of the flexible member 59 intersect at the center-line of the upstanding member. The direction changing pulleys 57 and 58 are each positioned so that the spacing between each of the pulleys 57 and 58 and the center-line of the upstanding member, as measured along the flexible member 59, is one-half of the spacing between the center-line and the respective edge members 29, also measured along the flexible member 59. For example, a first portion 59' of the flexible member 59 is one-half the length of a second portion 59" of the flexible member 59.

A thermostat 64 is positioned within the building structure and is electrically connected to a driving mechanism of a motor relay 65. The motor relay 65 has a contact member 66 which is movable to complete a first portion of an electrical circuit to effect closing movement of the closure member 7 when temperature within the building structure falls below a first preselected level. The contact member 66 engages contact points in the motor relay 65 to complete the electrical circuit to a power source 67 which is connected to the motor 55 whereby the motor 55 moves the closure member 7 until the closure member engages a limit switch 68 when the closure member 7 is in the closed position. The limit switch 68 is normally closed and engagement of the closure member 7 with the limit switch 68 breaks the circuit and thereby stops the drive motor 55 when the closure member 7 is in the closed position thereby completing an electrical circuit to a heater 69 within the structure 1.

When the temperature within the building structure rises above a selected level, the first portion of the electrical circuit is broken by the thermostat 64 allowing the contact member 66 to move away from the first contact points and to engage second contact points in the relay 65 and thereby completes a second portion of the electrical circuit to the drive motor 55 which is operative to move the closure member 7 to the open position. When the closure member 7 engages a normally closed limit switch 70 the second portion of the circuit to the drive motor 55 is broken thereby stopping the drive motor 55. A thermostat 71 is electrically connected to a normally open section 68' of the limit switch 68 and to a heater relay 72. The thermostat 71 in the heater portion of the electrical circuit operates on a narrower temperature range than the thermostat 64 which is operative to complete respective circuit portions to the drive motor 55.

A suitable switch 73 is positioned between one side of the power source 67 and the motor relay contact member 66. The switch 73 is operative to break the circuit to the drive motor 55 whereby the closure member 7 may be moved manually to any desired position, such as for adjusting the position of the enlarged end portions 53 and 54 of the flexible members 49 and 50, for preparing soil within the building structure with power equipment, and repairs to the building structure, closure member, and the like.

FIGS. 12 and 13 illustrate a modified greenhouse structure 74 which is similar to the greenhouse structure 1 except a front wall portion 75 of the modified greenhouse structure 74 has an upper edge 76 thereof spaced closer to the ground surface 11 and does not have a seal member thereon. The shorter front wall portion 75 permits growing plants, vegetables, and the like closer to the front wall portion 75 due to the fact that a shorter front wall portion permits a greater amount of sunlight to enter the modified greenhouse structure 74.

A modified closure member 77 is mounted within the modified greenhouse structure 74 and a side wall portion of the closure member 77 includes a lower edge panel 78 extending from a first or lower edge member 79 of each of opposite end portions 80 of the closure member 77. A seal member 81 is mounted on the lower edge 82 of the lower panel 78 of the side wall portion of the closure member 77 and the seal member 81 is engageable with the upper edge 76 of the front wall portion 75 when the closure member 77 is in the closed position.

The opposite end portions 80 of the closure member 77 include an upper or second edge member 83 positioned substantially perpendicular to the first edge member 79. A counterweight 84 is mounted on the second edge member 83 of each of the opposite end portions 80 of the closure member 77 to balance the addition of the lower panel 78 to the side wall portion of the closure member 77 and to add a balancing weight to each of the smaller end portions 80.

A flexible member 85, similar to and for the same purpose as the flexible member 59, has opposite ends thereof resiliently connected to the first and second end members 79 and 83. The illustrated connection of one end portion of the flexible member 85 is at a point in the center of the first or lower edge member 79 whereby the spacing of the connection of the one end portion of the flexible member 85 from the axle member equals one-half of the radius of the closure member 77. The other end portion of the flexible member 85 is connected to the second or upper edge member 83 at a point equal to one-half of the radius of the closure member 77.

The modified closure member 77 is opened and closed in the same manner as the closure member 7 and includes the same control components as illustrated in FIG. 11.

It is to be understood that while I have illustrated and described certain forms of my invention, it is not to be limited to these specific forms or arrangement of parts herein described and shown.

What I claim and desire to secure by Letters Patent is:

1. A greenhouse structure for growing plants and comprising:
    a. a building structure having a rear wall and opposite end walls and roof means cooperating with said rear wall and said opposite end walls to define an enclosed space having a front side with an inclined portion and an upright portion, said front side inclined portion having end portions cooperating with said roof means and said upright portion of said front side to define an opening therebetween in said inclined portion of said front side, said front side upright portion having end portions, said upright portion of said building structure front side including a removable center portion extending between said end portions of said front upright portion and having the major area of said center portion formed of translucent material;
    b. a closure member having a major area thereof formed of translucent material and pivoted on a horizontal axis and movable between open and closed positions respectively opening and closing said front side opening for controlling the entry of natural light and outside air for plants inside said building structure, said closure member having a cross sectional shape generally of a cylindrical segment;
    c. an earth floor within said building structure for growing plants;
    d. a plurality of translucent panels in said end portions of said front side inclined portion to permit sunlight to pass therethrough for substantially full utilization of the earth floor for growing plants;
    e. temperature responsive control means within said building structure; and
    f. drive means operatively connected to said closure member and controlled by said temperature responsive control means for moving said closure member between said open and closed positions in response to temperature changes within said building structure.

2. A greenhouse structure as set forth in claim 1 wherein:
    a. said center portion of said building structure front side upright portion has an upper edge;
    b. said closure member includes generally planar opposite end portions and a generally arcuate side wall portion extending between said generally planar opposite end portions whereby said closure member side wall portion extends outwardly beyond the inclined end portions of said building structure front side when said closure member is in the closed position; and
    c. said closure member side wall portion has one edge thereof in engagement with said upper edge of said upright portion.

3. A greenhouse structure as set forth in claim 2 wherein said opposite end portions and said side wall portion of said closure member each include a plurality of translucent panels to permit sunlight to pass therethrough.

4. A greenhouse structure as set forth in claim 1 wherein:
    a. said closure member includes means defining an elongated side wall having opposite side edges; and
    b. said removable center portion has an upper edge engageable by one side edge of said closure member when in closed position.

5. A greenhouse structure comprising:
    a. a building structure having wall means closing a rear side and opposite ends thereof and roof means cooperating with said wall means to define an enclosed space having an open front side;
    b. a closure member mounted within said building structure and movable between an open position and a closed position, said closure member having opposite end portions and a side wall having a plurality of translucent panels, said closure member closing the open front side of said building structure when in the closed position;
    c. means within said building structure for measuring temperature therein;
    d. means operatively connected to said closure member and electrically connected to said temperature measuring means for moving said closure member between the open position and the closed position in response to temperature measurement within said building structure, said means for moving said closure member between the open position and the closed position including:
1. a pair of upstanding members each positioned adjacent a respective one of the opposite ends of said building structure and each having an abutment member mounted thereon and extending transversely thereof, each of said abutment members having a first and second plurality of longitudinally spaced guide apertures therein;
2. a pair of axle members each mounted on a respective one of said upstanding members and having a respective one of the opposite end portions of said closure member pivotally mounted thereon;
3. an elongated flexible member having opposite ends thereof resiliently connected to one of said opposite end portions of said closure member at spaced apart locations; and
4. power means operatively engaging in intermediate portion of said elongated flexible member for effecting movement of the flexible member and thereby movement of said closure member;

e. a mounting member for each of the opposite end portions of said closure member and each having said respective axle member pivotally supporting same with one end of each of a first plurality of resilient members pivotally mounted thereon and positioned on one side of said respective axle member, each of said mounting members having one end of each of a second plurality of resilient members pivotally mounted thereon and positioned on the other side of said respective axle member, each of said resilient members of said first and second plurality thereof having a respective one of a first and second plurality of flexible members connected thereto and extending through a respective one of said guide apertures in a respective one of said abutment members, each of said flexible members of said first and second plurality thereof having an enlarged end portion engageable with said respective abutment member during movement of said closure member between the open position and the closed position whereby said resilient members cushion said movement; and f. heater means within said building structure for heating the enclosed space therein when said closure member is in the closed position.

6. A greenhouse structure as set forth in claim 5 including:

a. a first edge member and a second edge member for and mounted on each of the opposite end portions of said closure member, said elongated flexible member having one of the opposite ends thereof connected to the first edge member and the other of the opposite ends connected to the second edge member, said power means including a drive pulley driven by a reversible motor, said drive pulley being in engagement with the intermediate portion of said elongated flexible member; and b. first and second direction changing pulleys being laterlly spaced from and on opposite sides of said drive pulley, said first and second pulleys each being in engagement with said elongated flexible member.

* * * * *